United States Patent [19]

Kaye et al.

[11] Patent Number: 5,436,513
[45] Date of Patent: Jul. 25, 1995

[54] METHOD AND APPARATUS FOR PROVIDING ENERGY TO AN INFORMATION HANDLING SYSTEM

[75] Inventors: Jonathan A. Kaye, Frisco; Russell M. Rosenquist, Plano, both of Tex.

[73] Assignee: Texas Instruments Incorporated, Dallas, Tex.

[21] Appl. No.: 988,070

[22] Filed: Dec. 9, 1992

[51] Int. Cl.⁶ .................................. H02J 7/00
[52] U.S. Cl. .......................... 307/71; 307/66
[58] Field of Search ............ 307/64, 65, 66, 71, 307/75, 140; 364/498, 707; 365/226, 227, 228, 229

[56] References Cited

U.S. PATENT DOCUMENTS

| | | | |
|---|---|---|---|
| 3,871,383 | 3/1975 | Lee | 307/71 |
| 4,143,283 | 3/1979 | Graf et al. | 307/71 |
| 4,322,807 | 3/1982 | Chamran et al. | 364/498 |

Primary Examiner—Brian K. Young
Assistant Examiner—Peter Ganjoo
Attorney, Agent, or Firm—William E. Hiller; Richard L. Donaldson

[57] ABSTRACT

An information handling system is described having a power supply (16) having a switching circuit (24) that switches a plurality of energy sources (20) and (22) between series and parallel couplings. Associated with the switching circuit (24) is a voltage level detecting circuit (18) for monitoring the voltage level of the energy sources (20) and (22). A processor (12) for controlling the information handling system (10) responds to the voltage level detecting circuit (18) and in the event of a low voltage condition, the processor (12) activates the switching circuit (24) to switch the energy sources (20) and (22) from a series to a parallel coupling. Alternatively, processor (12) responds to other inputs or conditions for actuating switching circuit (24).

13 Claims, 2 Drawing Sheets

METHOD AND APPARATUS FOR PROVIDING ENERGY TO AN INFORMATION HANDLING SYSTEM

TECHNICAL FIELD OF THE INVENTION

This invention relates to information handling systems. More specifically, this invention relates to a method and apparatus for providing energy to an information handling system and more particularly to a power supply control circuit that switches energy sources from series to parallel.

BACKGROUND OF THE INVENTION

There has been a continuing trend in electronics to reduce the size of information handling devices such as computers, calculators and the like. Computers for instance have in the last decade gone from desk top units to a size that will now fit in the palm of the hand. With this shrinking in size, information handling systems more frequently rely on batteries as a source of energy to power the component parts of the system. Reliance upon battery power creates a problem with respect to maintaining power to essential components of the system such as the memory.

Prior solutions to this problem produce incompatible trade offs. One solution has been to add an additional battery used solely for the purpose of maintaining power to the memory when the primary energy source is removed. This requires an increase in space and adds weight to the system which is generally undesirable in portable systems.

Another trend in the field of electronics has been to provide devices that operate at a much wider range of voltages than in the past. It is now common, for instance, to have memory devices that will operate within a wide range of voltages. In prior approaches, generally a single energy source would be provided to supply energy at the optimum or highest operating level of the device. This creates two problems for the designer. If the higher operating voltage is chosen, there will tend to be a decrease in battery life, whereas, if the lower voltage is selected, battery life is increased but performance is sacrificed.

Thus, a need has arisen for a method and apparatus for providing energy to an information handling system that overcomes these disadvantages.

SUMMARY OF THE INVENTION

In accordance with the present invention, a method and apparatus for providing energy to an information handling system is provided which substantially eliminates or reduces disadvantages associated with prior systems and methods. The information handling system of the present invention comprises a memory, a display, an input device, a processor and a power supply. The memory stores data and instructions. The display presents information to the user and the input device permits the user to control and enter information into the system. The processor is associated with the memory, is responsive to the input device, transmits data to the display and executes instructions stored in the memory. The processor, and its associated logic means, provides overall control for the system. The power supply has a plurality of energy sources for providing energy to the system and includes an associated power supply control circuit. The power supply control circuit is responsive to a control signal from the processor and controls the coupling of the energy sources into either a series or a parallel configuration.

An important technical advantage of the present invention is that longer battery life can be achieved than is possible when the energy sources are connected in series only. Another important technical advantage of the present invention is that the energy sources can be replaced without the need for a dedicated memory back-up energy source. Another important technical advantage of the present invention is a that the processor switches the energy sources between a serial connection providing high performance and a parallel connection to extend the life of the energy sources. These important technical advantages are all achieved without any increase in space or weight.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1 through 4 of the drawings, like numerals being used for like and corresponding parts of the various drawings.

Figure 1:
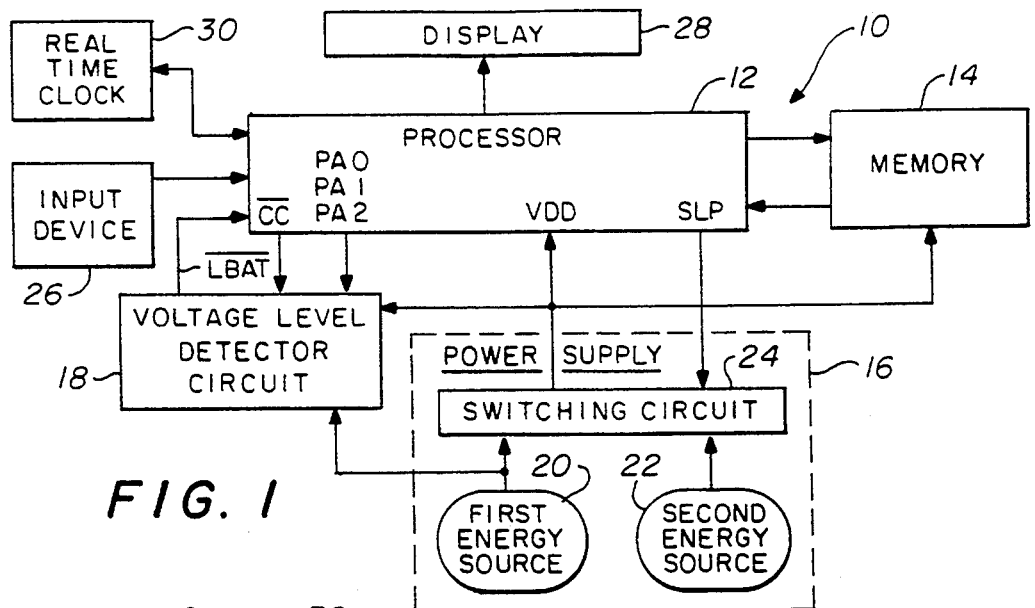
FIG. 1 illustrates a system block diagram according to the teachings of the present invention.

FIG. 1 illustrates an information handling system constructed according to the teachings of the present invention indicated generally at 10. System 10 comprises a processor 12 coupled to a memory 14. A typical processor is the Z80 microprocessor available from Zilog. The memory may be a suitable combination of RAM and ROM. This invention, however, is particularly useful where the memory requires power to maintain its contents such as in SRAM or DRAM. Processor 12 and memory 14 may alternatively be fabricated on the same semiconductor substrate such as a microcontroller. Processor 12 is responsive to execute instructions stored in memory 14. System 10 is powered by power supply 16. Power supply 16 is coupled to provide a voltage, VDD, to processor 12, memory 14, and a voltage level detector circuit 18.

Power supply 16 comprises first and second energy sources 20 and 22, and switching circuit 24. First and second energy sources may comprise, for example, 3 volt batteries. Switching circuit 24 is controlled by a signal, SLP, from processor 12 to couple first and second energy sources 20 and 22.

Voltage level detector circuit 18 is coupled to receive control signals, CC, PA0, PA1, and PA2, from processor 12 and to provide a signal, LBAT, to processor 12. Voltage level detector circuit 18 is also coupled to first energy source 20.

An input device 26, a display 28, and a real time clock 30 are coupled to processor 12. Input device 26 allows the user to input data into system 10. Real time clock 30 provides a signal to processor 12 to communicate the date and time to the system 10. In one embodiment, real time clock 30 is an oscillator that provides an input to a counter of processor 12. In an alternative embodiment, real time clock 30 is a separate chip for providing the date and time. Processor 12 is coupled to enable real time clock 30.

In operation, system 10 operates at two voltage levels, a high VDD and a low VDD. Power supply 16 provides system 10 with the appropriate voltage level based on a control signal, SLP, from the processor 12. Switching circuit 24 of power supply 16 is responsive to control signal SLP. Switching circuit 24 causes power supply 16 to supply a high VDD in response to a low SLP control signal by connecting first energy source 20 and second energy source 22 in series. Switching circuit 24 causes power supply 16 to supply a low VDD in response to a high SLP control signal by connecting first energy source 20 and second energy source 22 in parallel. The operation of one embodiment of a power supply 16 is detailed below with respect to FIG. 2.

A high SLP control signal is generated by the processor 12 in response to either of three events. First, processor 12 generates a high SLP control signal in response to a user input from input device 26 indicating the system 10 is being turned off. Second, processor 12 generates a high SLP signal if the system 10 is operating at a low performance level so as to enhance battery life. Third, processor 12 generates a high SLP signal if the voltage, VDD, of power supply 16 falls below a minimum operating voltage, VMIN, such as 3.8 volts, to lower energy consumption while maintaining a minimum memory retention voltage. Voltage level detector circuit 18 signals processor 12 when VDD falls below the voltage VMIN. The operation of one embodiment of voltage level detector circuit 10 is detailed below with respect to FIG. 3.

Figure 2:
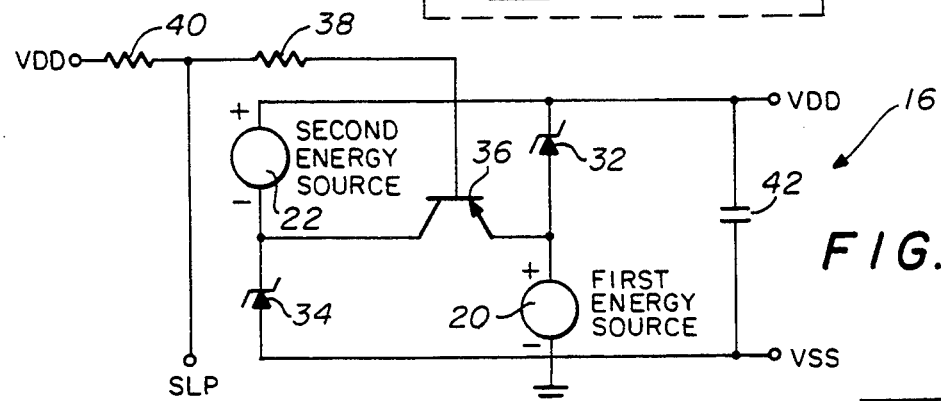
FIG. 2 is a schematic diagram of an embodiment of a power supply for use in connection with the present invention.

FIG. 2 illustrates an embodiment of a power supply indicated generally at 16. Power supply 16 comprises first and second energy sources 20 and 22, and first and second diodes 32 and 34. Energy sources 20 and 22 may comprise, for example, 3 volt batteries. A negative terminal of first energy source 20 is coupled to ground. A positive terminal of first energy source 20 is coupled to a first terminal of diode 32. A second terminal of diode 32 is coupled to VDD. A first terminal of diode 34 is coupled to ground. A second terminal of diode 34 is coupled to a negative terminal of second energy source 22. A positive terminal of second energy source 22 is coupled to VDD. An emitter of a transistor 36 is coupled to the positive terminal of first energy source 20. A collector of transistor 36 is coupled to the negative terminal of second energy source 22. A base of transistor 36 is coupled to receive a control signal, SLP, from processor 12 through a resistor 38. A resistor 40 is coupled between resister 38 and VDD. A capacitor 42 is also coupled between VDD and ground. Transistor 36 may comprise, for example, a PNP transistor.

In operation, transistor 36 switches first and second energy sources 20 and 22 between a series and a parallel coupling in response to the SLP control signal from processor 12. A high SLP control signal causes the emitter to base junction of transistor 36 to be reverse biased. Transistor 36 is turned off and the transistor approximates an open circuit between its emitter and its collector. The series combination of first energy source 20 and first diode 32 is in parallel with the series combination of second energy source 22 and second diode 34. First and second diodes 32 and 34 are forward biased and approximate short circuits. First energy source 20 and second energy source 22 are therefore coupled in parallel. Diodes 32 and 34 also prevent undesirable charging currents from a higher voltage energy source to a lower voltage energy source.

A low SLP control signal causes the emitter to base junction of transistor 36 to be forward biased. Transistor 36 is turned on and the transistor approximates a short circuit between its emitter and its collector. First and second diodes 32 and 34 are reverse biased and approximate open circuits. First and second energy sources 20 and 22 therefore are coupled in series.

Capacitor 42 controls the rate at which the voltage VDD changes when power supply 16 is switched between a parallel coupling and a series coupling of first and second energy sources 20 and 22.

Power supply 16 also switches from a series to a parallel coupling of first and second energy sources 20 and 22 if either first energy source 20 or second energy source 22 is removed from power supply 16.

Diodes 32 and 34 may comprise, for example, Schottky diodes. Schottky diodes are suitable for this embodiment of the present invention due to the low voltage required to forward bias the Schottky diode. The resulting voltage VDD more closely approximates the voltage of the first and second energy sources 20 and 22 when first and second energy sources 20 and 22 are connected in parallel.

Transistor 36 may comprise a Darlington pair. A Darlington pair is suitable for this embodiment of the present invention due to the low base current required to turn on the pair of transistors and the relative insensitivity to a load coupled to the pair of transistors.

Figure 3:
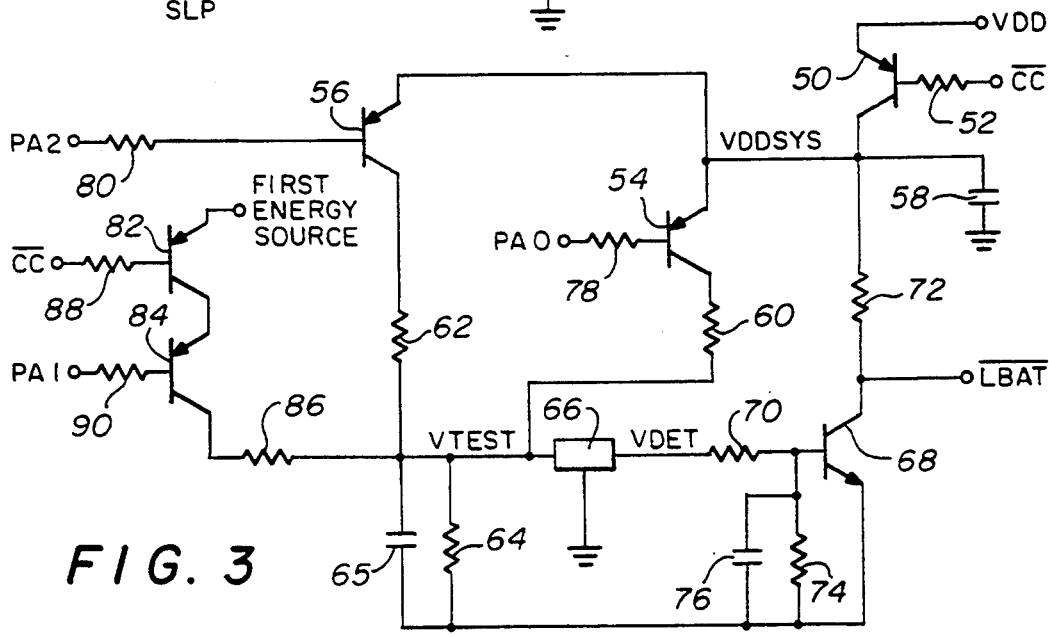
FIG. 3 is a schematic diagram of an embodiment of a voltage level detecting circuit for use in connection with the present invention.

FIG. 3 illustrates an embodiment of a voltage level detector circuit indicated generally at 18. Voltage level detector circuit 18 comprises a transistor 50 having an emitter coupled to VDD, and a base coupled through a resistor 52 to an enabling signal, CC. A collector of transistor 50 is coupled to an emitter of a transistor 54, an emitter of a transistor 56, and a capacitor 58 defining a voltage node VDDSYS. A collector of transistor 54 is coupled to a first end of a resistor 60. A collector of transistor 56 is coupled to a first end of a resistor 62. A second end of resistor 60 is coupled to a second end of resistor 62 and to a resistor 64 defining a voltage node VTEST. A capacitor 65 is coupled between voltage node VTEST and ground. A voltage level detector 66 is also coupled to voltage node VTEST. Voltage level detector 66 may comprise, for example, an S-807 series high precision voltage detector available from Seiko Instruments Inc. Voltage level detector 66 is also coupled to a base of a transistor 68 through a resistor 70. An emitter of transistor 68 is coupled to ground. A collector of transistor 68 is coupled through a resistor 72 to a collector of transistor 50. A resistor 74 and a capacitor 76 are also coupled between the base of transistor 68 and ground. Control signal PA0 is coupled to a base of transistor 54 through a resistor 78. Control signal PA2 is coupled to a base of transistor 56 through resistor 80. An emitter of transistor 82 is coupled to first energy source 20. A collector of transistor 82 is coupled to an emitter of transistor 84. A collector of transistor 84 is coupled through a resistor 86 to the voltage node VTEST. Enabling signal CC is coupled to a base of transistor 82 through a resistor 88. Control signal PA1 is coupled to a base of transistor 84 through a resistor 90. Transistors 50, 54, 56, 82, and 84 may comprise, for example, PNP transistors or Darlington pairs. Transistor 68 may comprise, for example, an NPN transistor or a Darlington pair.

In operation, transistor 50 operates to enable the voltage level detector circuit 18. A high CC control signal reverse biases the emitter to base junction of the transistor 50. Transistor 50 is turned off and approximates an open circuit between its emitter and its collector. Therefore, the voltage node VDDSYS is approximately equal to ground and the voltage level detector circuit 18 is disabled.

A low CC control signal forward biases the emitter to base junction of transistor 50. Transistor 50 is turned on and approximates an open circuit between its emitter and its collector. Voltage node VDDSYS is approximately equal to VDD. Voltage level detector circuit 18 is thereby enabled.

When enabled, voltage level detector circuit 18 is operable to perform 3 separate tests responsive to control signals PA0, PA1, and PA2 from processor 12. Control signal PA0 tests the voltage level of VDD to determine if the power supply 16 is at least producing a minimal normal voltage level, VNORM. VNORM may comprise, for example, 4.0 volts. Control signal PA2 tests whether the voltage level of VDD is greater than a minimal operating voltage level, VMIN. VMIN may comprise, for example, 3.8 volts. Control signal PA1 tests whether the voltage level of first energy source 20 is above a minimum energy source level, VBMIN. VBMIN may comprise, for example, 2.5 volts.

Control signals PA0, PA1, and PA2 are maintained at a high logic level until the processor 12 is instructed to test voltage levels. First, the control signal PA0 is brought to a low voltage level by processor 12. The emitter to base junction of the transistor 54 is forward biased. Transistor 54 is turned on and approximates a short circuit between its emitter and its collector. The voltage VDDSYS is divided over resistors 60 and 64 producing a voltage VTEST. The voltage VTEST is compared with a reference voltage determined by voltage detector 66. If the voltage VDD is greater than the voltage VNORM, the voltage VTEST is output to transistor 68 through resistor 70. The base to emitter junction of transistor 68 is forward biased and transistor 68 is turned on. The collector to emitter of transistor 68 approximates a short circuit. The voltage at the collector of transistor 68, LBAT, is approximately equal to ground indicating to the processor 12 that the power supply 16 is operating above the voltage VNORM. If, however, the voltage VDD is less than the voltage VNORM, voltage detector 66 outputs a voltage level approximately equal to ground to transistor 68 through resistor 70. The base to emitter junction of transistor 68 is reverse biased and transistor 68 is turned off. The collector to emitter of transistor 68 approximates an open circuit. The voltage at the collector of transistor 68, LBAT, is a high voltage level approximating VDD indicating to processor 12 that the power supply 16 is operating at below the voltage VNORM.

If the voltage level of VDD is greater than the voltage VNORM, processor 12 does not instruct voltage level detector circuit 18 to perform the remaining two tests. If the voltage level of VDD is less than the voltage VNORM, processor 12 instructs voltage level detector 18 to continue as follows.

Processor 12 returns the control signal PA0 to a high voltage level and brings the control signal PA2 to a low voltage level. The emitter to base junction of transistor 56 is forward biased and transistor 56 is turned on. The emitter to collector of transistor 56 approximates a short circuit. The voltage VDDSYS is divided over resistor 62 and 64 providing a voltage VTEST. If VDD is greater than the voltage VMIN, voltage detector 66 passes a low voltage level to transistor 68 through resistor 70. The base to emitter junction of transistor 68 is reversed biased and transistor 68 is turned off. The collector to emitter of transistor 68 approximates an open circuit. The collector voltage of transistor 68, LBAT, is a high voltage level approximately equal to VDD indicating to the processor 12 that the voltage VDD is below the minimal operating voltage level. If, however, VDD is greater than the voltage VMIN, voltage detector 66 passes the voltage VTEST to transistor 68 through resistor 70. The base to emitter junction of transistor 68 is forward biased and transistor 68 is turned on. The collector to emitter of transistor 68 approximates a short circuit. The voltage at the collector of transistor 68, LBAT, is a low voltage level indicating to the processor 12 that power supply 16 is producing enough power to continue operation.

Next, control signal PA2 is returned to a high voltage level and control signal PA1 is brought to a low voltage level to test the voltage of first energy source 20. Processor 12 applies a low CC control signal to the base of transistor 82. The emitter to base junction of transistor 82 is forward biased and transistor 82 is turned on. The emitter to collector of transistor 82 approximates a short circuit. The voltage at the collector of transistor 82 is therefore approximately equal to the voltage of the first energy source 20. Similarly, the low PA1 control signal forward biases the emitter to base junction of transistor 84 and transistor 84 is turned on. The emitter to collector of transistor 84 approximates a short circuit. The voltage at the collector of transistor 84 therefore is approximately equal to the voltage level of the first energy source 20. The voltage of the collector of transistor 84 is divided over the resistors 86 and 64 producing a voltage VTEST. Voltage detector 66 compares the voltage level of first energy source 20 with the voltage VBMIN. If VTEST is greater than the voltage VBMIN, voltage detector 66 passes the voltage VTEST to transistor 68 through resistor 70. The base to emitter junction of transistor 68 is forward biased and transistor 68 is turned on. The collector to emitter of transistor 68 approximates a short circuit. The voltage at the collector of transistor 68, LBAT, is brought to a low voltage level indicating to the processor 12 that the second energy source 22 needs to be replaced. If, however, the voltage level of first energy source 20 is less than the voltage VBMIN, voltage detector 66 outputs a low voltage level to transistor 68 through resistor 70. The base to emitter junction of transistor 68 is reverse biased and transistor 68 is turned off. The collector to emitter of transistor 68 approximates an open circuit. The voltage at the collector of transistor 68, LBAT, is brought to a high voltage level indicating to the processor 12 that the first energy source 20 needs to be replaced.

The voltage level tests performed in voltage level detector circuit 18 according to the control signals PA0, PA1, and PA2 are accomplished using a single voltage level detector 66 even though the three tests check for different voltage levels. This is possible because the voltages that are being tested are divided in turn over resistor pairs 60 and 64, 62 and 64, and 86 and 64. In each test, VTEST is less than the trigger voltage of the voltage detector 66 if the tested voltage is below the minimal acceptable level for that test.

Figure 4:
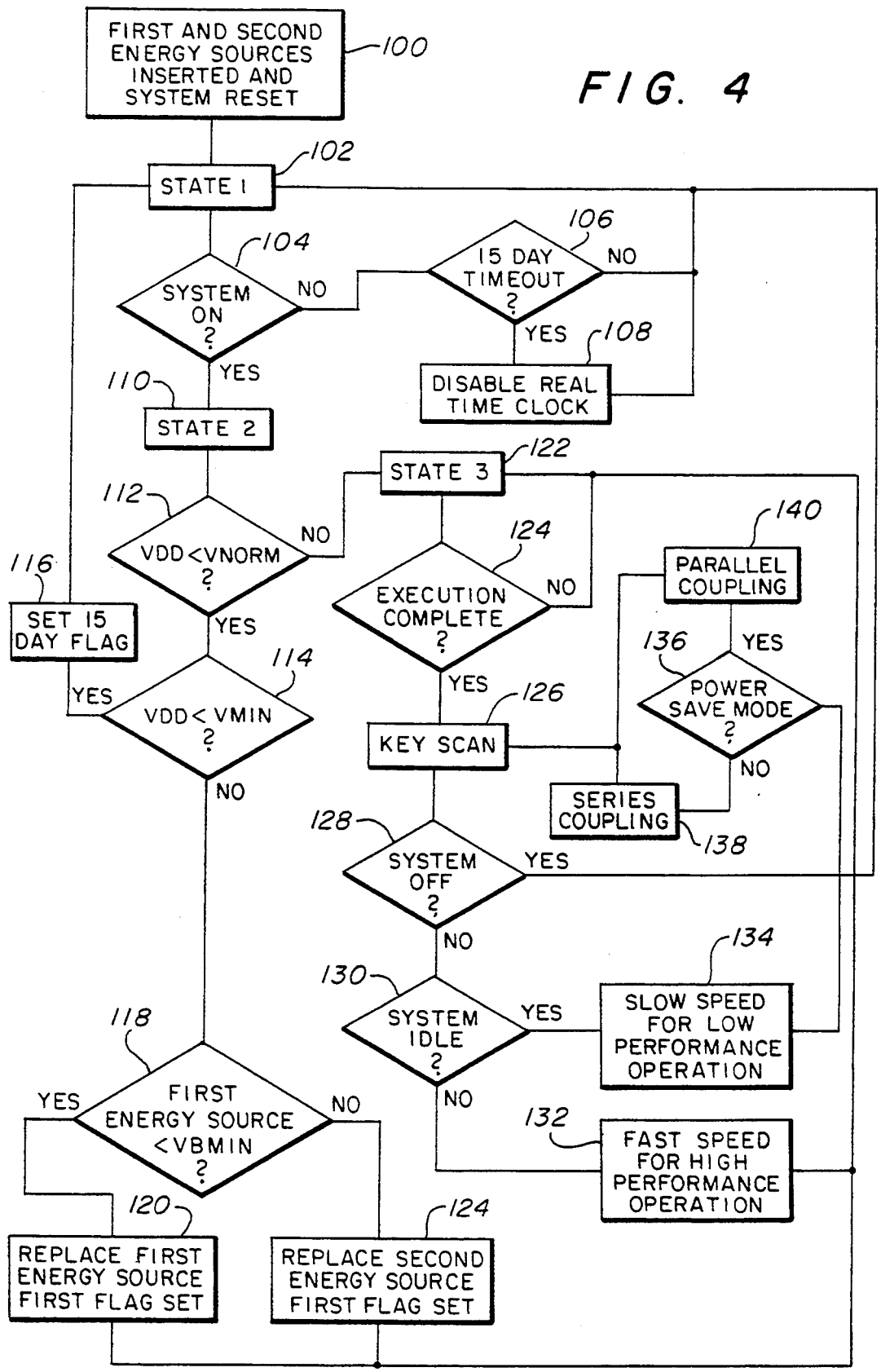
FIG. 4 is a flow chart illustrating a method of practicing the present invention.

FIG. 4 is a flow chart illustrating a method of practicing the present invention. The method begins at 100 wherein first and second energy sources 20 and 22 are inserted into power supply 16 and a 15 day flag of system 10 is reset. System 10 enters a state 1 at 102. In state 1, first and second energy sources 20 and 22 of power supply 16 are coupled in parallel such that power supply 16 provides a minimum memory retention voltage to memory 14 to maintain any data stored in memory 14. A decision is made at 104 in the processor 12 as to whether the system 10 has been turned on. If the answer is no, a decision is made at 106 as to whether the system 10 has been in state i of step 102 with the 15 day flag set for more than 15 days. If the answer is no, the system 10 remains in state 1. If, however, the answer is yes, the method proceeds to step 108. At step 108, processor 12 disables real time clock 30 and the method proceeds to step 102.

At decision block 104, if the processor 12 determines that the system 10 has been turned on, the method proceeds to a state 2 at step 110. In state 2, first and second energy sources 20 and 22 are coupled in series by switching circuit 24 of power supply 16 in response to a control signal SLP from processor 12. At step 112, a decision is made in voltage level detector circuit 18 as to whether VDD is less than VNORM in response to control signal from processor 12. If the answer is yes, the method proceeds to step 114. At step 114, a decision is made in voltage level detector circuit 18 as to whether VDD is less than VMIN in response to a control signal from processor 12. If the answer is yes, processor 12 sets a 15 day flag at step 116 indicating that the system is operating below the minimal operating voltage level, VMIN, and that the system 10 will disable the real time clock in 15 days unless the 15 day flag is reset.

At decision block 114, if voltage level detector circuit 18 determines that the voltage level VDD is greater than VMIN, the method would proceed to step 118. At step 118, a decision is made as to whether the voltage level of first energy source 20 is less than VBMIN. This test is accomplished in voltage level detector circuit 18 according to a control signal from processor 12. If the voltage level of first energy source 20 is less than VBMIN, the method proceeds to step 120. At step 120, the processor sets a flag indicating that the first energy source 20 needs to be replaced first. The method proceeds to a state 3 at step 122. In state 3, the first and second energy sources 20 and 22 are connected in series and the system 10 executes various operations, for example, calculating or processing data. If the answer at decision block 118 is no, the processor 12 sets a flag indicating that the second energy source 22 must be replaced first and the method proceeds to state 3 at step 122.

At decision block 112, if voltage level detector circuit 18 determines that the voltage level VDD is greater than VNORM, the system 10 would enter state 3 at step 122. A decision is made at 124 as to whether the processor 12 has completed executing the current operation. If the answer is no, the system 10 returns to state 3 at 122. If, however, the answer is yes, the method proceeds to step 126. At step 126, the system enters a key scan mode. In the key scan mode, the processor 12 checks for input from, for example, input device 26 or an interrupt. A decision is made at 128 in processor 12 as to whether the system 10 has been turned off. If the answer is yes, the method proceeds to state 1 at 102. If, however, the answer is no, a decision is made at 130 as to whether the system 10 should be put into idle mode. If the answer is no, the system 10 operates at a fast speed comprising, for example, one megahertz, for high performance operation at 132. The method proceeds to state 3 at 122.

At decision block 130, if the system 10 has determined to go into idle mode, the system 10 operates at a slow speed comprising, for example, ten kilohertz, for low performance operation at 134. At decision block 136, a decision is made in processor 12 as to whether the system 10 should enter a power save mode with first and second energy sources 20 and 22 coupled in parallel. If the answer is yes, the first and second energy sources 20 and 22 are coupled in parallel by switching circuit 24 of power supply 16. The method proceeds to a key scan mode at 126. If, however, the decision at decision block 136 is no, the system 10 operates in a series coupling of first and second energy sources 20 and 22. The system proceeds to 126.

From the foregoing description, it will be seen that, in accordance with the present invention, an information handling system is provided with a power supply control circuit for switching energy sources from a series coupling to a parallel coupling upon the detection of predetermined inputs or conditions. The invention overcomes the disadvantages of prior systems and methods by extending the life of the energy sources without an increase in weight or space. While the invention has been particularly shown and described with reference to one embodiment, it will be understood that various changes in form and detail may be made without departing from the spirit and scope of the invention.

What is claimed is:

1. An information handling system comprising:
   a memory;
   an input device;
   a processor operably connected to said memory and to said input device for receiving data from said input device and for executing instructions stored in said memory;
   a power supply having a plurality of energy sources for providing energy to the system;
   a voltage level detecting circuit connected to said power supply for monitoring the voltage level of said plurality of energy sources;
   a power supply control circuit connected to said processor and to said plurality of energy sources of said power supply and responsive to a coupling control signal from said processor for coupling said plurality of energy sources in series in a first operating mode and for coupling said plurality of energy sources in parallel with respect to each other in a second operating mode;
   said processor being responsive to a low voltage detection signal from said voltage level detecting circuit when said voltage level detecting circuit senses a low voltage condition below a predetermined voltage threshold of said plurality of energy sources for producing a coupling control signal to said power supply control circuit; and
   said power supply control circuit being responsive to the coupling control signal from said processor for switching said plurality of energy sources from a series coupling in the first operating mode to a parallel coupling of said plurality of energy sources in the second operating mode.

2. The information handling system of claim 1, further comprising a display operably connected to said processor for receiving data as transmitted thereto by said processor; and circuitry associated with said processor for displaying a low energy level signal by said display if the voltage level of said energy source is less than said predetermined voltage threshold.

3. The information handling system of claim 1, wherein said plurality of energy sources comprises respective batteries.

4. The information handling system of claim 1, wherein:

said voltage level detecting circuit is effective for comparing a voltage level of said power supply with a plurality of predetermined voltage levels including at least a high voltage level and a low voltage level and for producing a disabling control signal in response to detection of the low voltage level; and circuitry responsive to said disabling control signal for disabling a load of the system from drawing power from said power supply if the voltage level of said power is less than said predetermined low voltage level.

5. The information handling system of claim 1, wherein the plurality of energy sources of said power supply comprises first and second batteries having respective positive and negative terminals;

said power supply control circuit including a switching transistor having a control gate and connected between the first and second batteries; and the control gate of said switching transistor being connected to said processor for receiving the coupling control signal from said processor for switching the first and second batteries from a series coupling in the first operating mode to a parallel coupling of the first and second batteries in the second operating mode.

6. The information handling system of claim 5, wherein said switching transistor of said power supply control circuit is a bipolar transistor having base, emitter and collector electrodes with the base electrode being the control gate of the switching transistor;

said power supply control circuit further including first and second power supply terminals, first and second diodes having respective first and second diode terminals, a capacitor having its opposite ends connected to said first and second power supply terminals, the first diode terminal of said first diode being connected to the emitter electrode of said bipolar transistor and to the positive terminal of said first battery, the second diode terminal of said first diode being interconnected between said first power supply terminal and the positive terminal of said second battery and connected to one end of said capacitor, the first diode terminal of said second diode being connected to said second power supply terminal and to the other end of said capacitor, and the second diode terminal of said second diode being connected to the collector electrode of said bipolar transistor and to the negative terminal of said second battery.

7. The information handling system of claim 6, wherein said first and second diodes are Schottky diodes.

8. The information handling system of claim 1, wherein said voltage level detecting circuit includes an enabling transistor having a control gate for receiving a control signal from said processor which may be provided as an enabling signal or a non-enabling signal;

first, second, and third transistors having respective control gates;

first, second, and third detector level terminals for respectively receiving first, second, and third test control signals corresponding to different voltage level detection tests, said first, second, and third detector level terminals being respectively connected to the control gates of said first, second, and third transistors;

a voltage detector connected to the outputs of said first, second, and third transistors;

each of said first, second, and third transistors being selectively rendered conductive in response to a corresponding test control signal from the processor as applied to said first, second, and third detector level terminals and to the control gate of the selected transistor via the corresponding one of said first, second, and third detector level terminals; and said voltage detector being responsive to the output from the selected transistor to provide an output indicative of the status of the power supply according to the particular voltage level detection test corresponding to the one of said first, second, and third test control signals applied to the selected one of said first, second, and third detector level terminals;

whereby a plurality of separate voltage level tests at different voltage levels are performable by said voltage level detecting circuit using only a single voltage detector.

9. The information handling system of claim 8, wherein said first, second, and third transistors of said voltage level detecting circuit are bipolar transistors.

10. A method for controlling a power supply in an information handling system wherein said power supply has a plurality of energy sources, comprising the steps of:

comparing a system voltage level with a first predetermined voltage level;

switching the plurality of energy sources to a series coupling if the system is on, and the system voltage level is greater than the first predetermined voltage level;

switching the plurality of energy sources to a parallel coupling if the system is off;

comparing the system voltage level with a second predetermined voltage level; and switching the plurality of energy sources to a parallel coupling if the system voltage level is less than the second predetermined voltage level.

11. The method of claim 10, further comprising the steps of:

comparing a voltage level of one of the plurality of energy sources with a third predetermined voltage level in a voltage level detection circuit; and prompting for replacement of the one energy source if the voltage level is less than the third predetermined voltage level.

12. The method of claim 10, further comprising the steps of:

running the system at a slow speed for low performance operation; and running the system at a fast speed for high performance operation.

13. The method of claim 10, further comprising the steps of:

coupling the plurality of energy sources in parallel in response to a control signal from a processor of the system to enter a power save mode; and coupling the plurality of energy sources in series in response to a second control signal from the processor to exit the power save mode.

* * * * *